(12) United States Patent
Lu

(10) Patent No.: US 8,847,948 B2
(45) Date of Patent: Sep. 30, 2014

(54) 3D MODEL COMPARISON

(75) Inventor: Tong Lu, Jiangsu (CN)

(73) Assignee: Nanjing University, Jiangsu (CN)

( * ) Notice: Subject to any disclaimer, the term of this patent is extended or adjusted under 35 U.S.C. 154(b) by 564 days.

(21) Appl. No.: 13/101,087

(22) Filed: May 4, 2011

(65) Prior Publication Data

US 2011/0292037 A1     Dec. 1, 2011

(51) Int. Cl.
| | | |
|---|---|---|
| G09G 5/00 | (2006.01) | |
| G06T 15/00 | (2011.01) | |
| G06K 9/68 | (2006.01) | |
| G06T 17/00 | (2006.01) | |
| G06K 9/00 | (2006.01) | |

(52) U.S. Cl.
CPC ............ *G06T 17/00* (2013.01); *G06K 9/00214* (2013.01)
USPC ........... 345/419; 345/643; 345/644; 382/218; 382/219; 382/220

(58) Field of Classification Search
USPC ........................... 345/419; 382/100, 218–220
See application file for complete search history.

(56) References Cited

U.S. PATENT DOCUMENTS

| | | |
|---|---|---|
| 7,397,473 B2 | 7/2008 | Chakraborty |
| 7,548,650 B2 | 6/2009 | Qamhiyah et al. |
| 2009/0157649 A1 | 6/2009 | Papadakis et al. |

FOREIGN PATENT DOCUMENTS

| | | |
|---|---|---|
| CN | 101315661 | 12/2008 |
| CN | 101477529 | 7/2009 |
| CN | 101639939 | 2/2010 |

OTHER PUBLICATIONS

Yang, Su. "Symbol recognition via statistical integration of pixel-level constraint histograms: A new descriptor." Pattern Analysis and Machine Intelligence, IEEE Transactions on 27.2 (2005): 278-281.*
Zhang, Jing, and Liu Wenyin. "A pixel-level statistical structural descriptor for shape measure and recognition." Document Analysis and Recognition, 2009. ICDAR'09. 10th International Conference on. IEEE, 2009.*
Au, Oscar Kin-Chung, et al. "Skeleton extraction by mesh contraction." ACM Transactions on Graphics (TOG). vol. 27. No. 3. ACM, 2008.*
Bai, Xiang, and Longin Jan Latecki. "Path similarity skeleton graph matching."Pattern Analysis and Machine Intelligence, IEEE Transactions on 30.7 (2008): 1282-1292.*
International Search Report and Written Opinion mailed Mar. 10, 2011 for PCT Application Serial No. PCT/CN2010/073378, 12 pages.
Au, O., et al., "Skeleton Extraction by Mesh Contraction," ACM Transactions on Graphics, Aug. 2008, vol. 27, No. 3, 10 pages.
Cardone A. et al., "A Survey of Shape Similarity Assessment Algorithms for Product Design and Manufacturing Applications," Journal of Computing and Information Science in Engineering 2003, vol. 3, pp. 109-118.

(Continued)

*Primary Examiner* — Ulka Chauhan
*Assistant Examiner* — Schiller Hill
(74) *Attorney, Agent, or Firm* — Amin, Turocy & Watson, LLP

(57) ABSTRACT

Techniques for comparing 3D models are provided. A method for comparing 3D models includes obtaining a first skeleton of a first 3D model, obtaining a second skeleton of a second 3D model, and calculating similarity between the first and the second 3D models based on distance, angle, and inter-position related global constraints of the first and the second skeletons.

25 Claims, 5 Drawing Sheets

(56) References Cited

OTHER PUBLICATIONS

El-Mehalawi M. and Miller R.A., "A Database System of Mechanical Components Based on Geometric and Topologic Similarity," Part I: Representation, Computer-Aided Design, 2003, vol. 35, No. 1, pp. 83-94.

El-Mehalawi M. and Miller R.A., "A Database System of Mechanical Components Based on Geometric and Topologic Similarity," Part II: Indexing, Retrieval, Matching and Simility Assessment Computer-Aided Design, 2003, vol. 35, No. 1, pp. 95-105.

Funckhouser, T. et al. "A Search Engine for 3D Models," ACM Transactions on Graphics, 2003, vol. 22, No. 1, pp. 83-105.

Gunn, T.G. "The Mechanization of Design and Manufacturing," Scientific American 1982, vol. 247, No. 3, pp. 86-108.

Hilaga M. et al., "Topology Matching for Fully Automatic Similarity Estimation of 3D Shapes," ACM SIGGRAPH, 2001, pp. 203-212.

Ji Q and Marefat M. "Machine Interpretation of CAD Data for Manufacturing Applications," ACM Computing Surveys, 1997, vol. 24, No. 3, pp. 264-310.

Leizerowicz, W. et al., "Collaborative design using WWW," In: Proceedings of the WET-ICE'96, CERC, University of West Virginia 1996.

Novotni M. and Klein R. "3D Zernike Descriptors for Content Based Shape Retrieval," In: Proceedings of ACM Symposium on Solid Modeling and Applications, Washington, USA, 2003, pp. 216-225.

Remesh M. et al., "Feature Based Shape Similarity Measurement for Mechanical Parts," ASME J. Comput. Inf. Sci. 2001, vol. 1, No. 3, pp. 245-256.

Su Y., "Symbol Recognition Via Statistical Integration of Pixel-Level Constraint Histograms: A New Descriptor," IEEE Transactions on Pattern Analysis and Machine Intelligence 2005, vol. 27, No. 2, pp. 278-281.

* cited by examiner

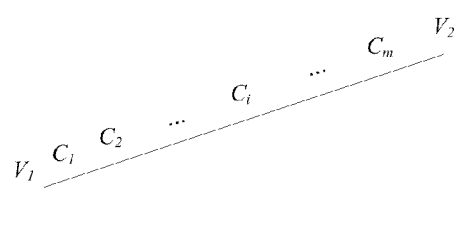
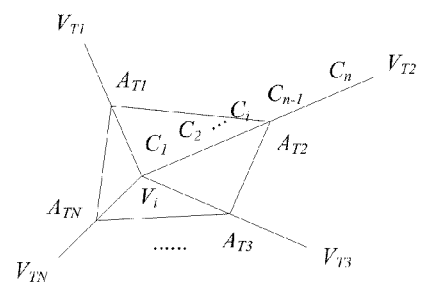
FIG. 2
FIG. 3
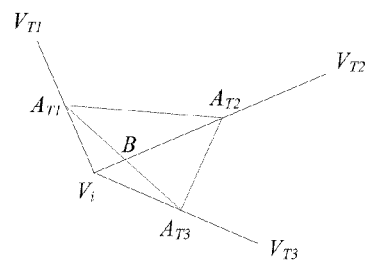
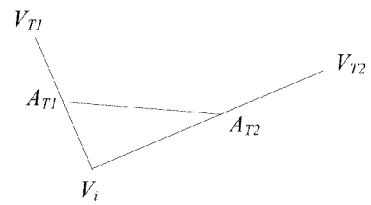
FIG. 4
FIG. 5

3D MODEL COMPARISON

This patent application is a national stage application of, and claims priority to, the corresponding PCT international application No. PCT/CN2010/073378, filed May 31, 2010, and entitled "3D MODEL COMPARISON", the entirety of which is hereby incorporated by reference.

BACKGROUND

There are three major categories of methods for comparing 3D models: (1) profile based methods, which may compare 3D models using distribution of vertices and meshes; (2) topology based methods, which may compare 3D models using topology characteristics; and (3) visual feature based methods, which may compare 3D models using visual features. However, these conventional methods all consume excessive calculation resources to compare 3D models due to 3D model surface complexity.

SUMMARY

In one aspect of the present disclosure, a method for comparing 3D models is provided. The method includes obtaining a first skeleton of a first 3D model; obtaining a second skeleton of a second 3D model; and calculating similarity between the first and the second 3D models based on the first and the second skeletons.

In some embodiments, calculating similarity between the first and the second 3D models includes obtaining a first set of matrices of the first skeleton, where the first set of matrices includes a matrix of distance related global constraint and a matrix of angle related global constraint of the first skeleton; obtaining a second set of matrices of the second skeleton, where the second set of matrices includes a matrix of distance related global constraint and a matrix of angle related global constraint of the second skeleton; and calculating similarity between the first and the second 3D models using the first and the second sets of matrices.

In some embodiments, calculating similarity between the first and the second 3D models includes summing up absolute values of differences between corresponding elements of the first and the second sets of matrices.

In some embodiments, the first set of matrices further includes a matrix of weight related global constraint, and the second set of matrices further includes a matrix of weight related global constraint. In some embodiments, weight related global constraint includes inter-position related global constraint.

In some embodiments, the operation of obtaining the first set of matrices includes the following operations: sampling the first skeleton to obtain a first set of points; and calculating the first set of matrices based on the first set of points. In some embodiments, the first set of points includes sampled points and the end points of the first skeleton.

In some embodiments, distance related global constraint is defined as: $L_{ij}(P_k)=\min\{|P_kP_i|/|P_kP_j|, |P_kP_j|/|P_kP_i|\}$, where $P_k$ is reference point. In some embodiments, the operation of obtaining a matrix of distance related global constraint includes: dividing the range of $L_{ij}$ into s sub-regions; calculating the ratio of elements in the $q^{th}$ sub-region over the number of all elements using the following equation for each point:

$$R_{Lq}(P_k) = \frac{2}{(s-1)(s-2)} \sum_{i=1}^{s-2} \sum_{j=i+1}^{s-1} h(L_{ij}(P_k)),$$

where $h(L_{ij}(P_k))=1$, if $L_{ij}$ is in the $q^{th}$ sub-region, otherwise $h(L_{ij}(P_k))=0$; and generating a matrix of distance related global constraint using the calculated ratios.

In some embodiments, angle related global constraint is defined as the following equation: $A_{ij}(P_k)=\angle P_iP_kP_j$, where $P_k$ is a reference point. In some embodiments, the operation of obtaining a matrix of angle related global constraint includes: dividing the range of $A_{ij}$ into s sub-regions; calculating the ratio of elements in the $q^{th}$ sub-region over the number of all elements using the following equation for each point:

$$R_{Aq}(P_k) = \frac{2}{(s-1)(s-2)} \sum_{i=1}^{s-2} \sum_{j=i+1}^{s-1} h(A_{ij}(P_k)),$$

where $h(A_{ij}(P_k))=1$, if $A_{ij}$ is in the $q^{th}$ sub-region, otherwise $h(A_{ij}(P_k))=0$; and generating a matrix of angle related global constraint using the calculated ratios.

In some embodiments, the first set of matrices further include a matrix of inter-position related global constraint, and inter-position related global constraint is defined as the following equation:

$$N_{ij}(P_k) = \frac{N(P_i) + N(P_j)}{N(P_k) + N(P_i) + N(P_j)},$$

where $P_k$ is reference point, $N(P_i)=S_v(P_i)/(S_m(P_i)+1)+S_v(P_i) \% (S_m(P_i)+1)$, where $S_v(P_i)$ is the number of lines for which $P_i$ is one of the end points, $S_m(P_i)$ is the number of sample points being weighted towards $P_i$. In some embodiments, the operation of obtaining a matrix of inter-position related global constraint includes: dividing the range of $N_{ij}$ into s sub-regions; calculating the ratio of elements in the $q^{th}$ sub-region over the number of all elements using the following equation for each point:

$$R_{Nq}(P_k) = \frac{2}{(s-1)(s-2)} \sum_{i=1}^{s-2} \sum_{j=i+1}^{s-1} h(N_{ij}(P_k)),$$

where $h(N_{ij}(P_k))=1$, if $N_{ij}$ is in the $q^{th}$ sub-region, otherwise $h(N_{ij}(P_k))=0$; and generating a matrix of inter-position related global constraint using the calculated ratios.

In some embodiments, the similarity between the first and the second 3D models are calculated using distance, and angle related global constraints of the first and the second skeletons.

In some embodiments, the similarity between the first and the second 3D models are calculated using distance, angle, and inter-position related global constraints of the first and the second skeletons.

In another aspect of the present disclosure, a device for comparing 3D models is provided. The device includes: means for obtaining skeletons of 3D models; and means for calculating similarity between the 3D models based on distance, angle, and inter-position related global constraints of the corresponding skeletons. In some embodiments, the means for calculating similarity further includes: means for obtaining distance, angle, and inter-position related global constraints matrices of 3D models to be compared; and means for calculating similarity between 3D models using matrices obtained by the global constraints matrices obtaining device.

In another aspect of the present disclosure, a system for comparing 3D models is provided. The system includes: a global constraints matrices obtaining device to obtain distance, angle, and inter-position related global constraints matrices of 3D models; and a similarity calculating device to calculate similarity between 3D models using matrices obtained by the global constraints matrices obtaining device.

In some embodiments, the system further includes: a sampling device to sample skeletons of 3D models to obtain corresponding sets of sample points. The global constraints matrices obtaining device includes: a distance related global constraint matrix generating device to generate matrices of distance related global constraint based on sample points obtained by the sampling device and end points of corresponding skeletons; an angle related global constraint matrix generating device to generate matrices of angle related global constraint based on sample points obtained by the sampling device and end points of corresponding skeletons; and an inter-position related global constraint matrix generating device to generate matrices of inter-position related global constraint based on sample points obtained by the sampling device and end points of corresponding skeletons.

In some embodiments, the system further includes a skeleton receiving device for receiving skeletons.

In some embodiments, the system further includes a 3D model storage device for storing 3D models. In some embodiments, the 3D model storage device can also store corresponding skeletons.

In some embodiments, the similarity calculating device calculates similarity between 3D models by summing up absolute values of differences between corresponding elements of corresponding matrices of distance, angle, and inter-position related global constraints.

In another aspect of the present disclosure, a computer readable medium having a computer program stored therein is provided. When executed by a computer, the computer program will instruct the computer to conduct a method for comparing 3D models based on distance, angle, and inter-position related global constraints of the corresponding skeletons.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2 shows an example graph illustrating how to sample a line.

FIG. 3 shows an example graph illustrating how to weight an end point when the end point is a common end point of more than three lines.

FIG. 4 shows an example graph illustrating how to weight an end point when the end point is a common end point of three lines.

FIG. 5 shows an example graph illustrating how to weight an end point when the end point is a common end point of two lines.

DETAILED DESCRIPTION OF ILLUSTRATIVE EMBODIMENTS

Figure 1:
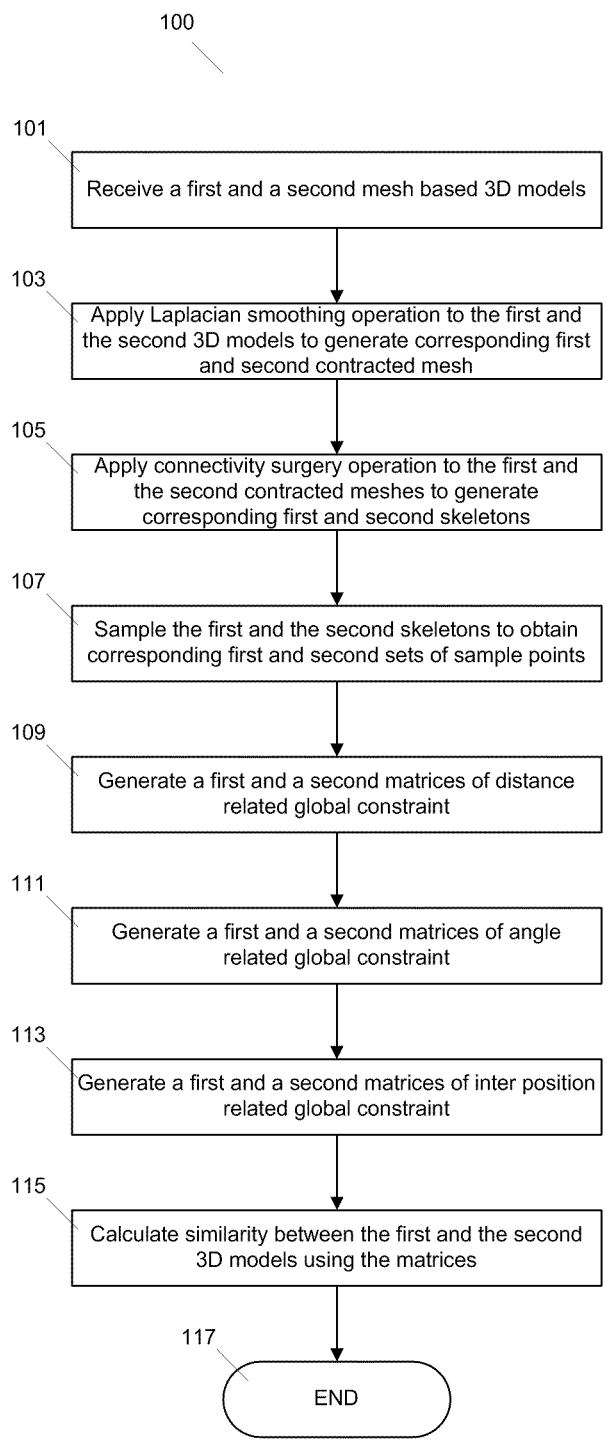
FIG. 1 shows a flowchart of an illustrative embodiment of a method for comparing 3D models.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Referring to FIG. 1, a flowchart of an illustrative embodiment of a method 100 for comparing 3D models is shown. In block 101, a first and a second mesh based 3D models are received for comparison. In block 103, a Laplacian smoothing operation is applied to the mesh surfaces of the first and the second 3D models to generate a first and a second contracted meshes. Application of the Laplacian smoothing operation moves the vertices along their approximate curvature normal direction, such that the details and noise are removed from the mesh surfaces so as to generate a first and a second contracted meshes. In block 105, a connectivity surgery operation is applied to the first and the second contracted meshes to generate corresponding first and second skeletons. In this operation, a series of edge-collapses are applied to remove collapsed faces from the first and the second contracted meshes, until almost all or all faces have been removed. One requirement here is to retain the shape of the contracted meshes during this operation, while keeping sufficient skeletal nodes to maintain a fine correspondence between corresponding skeleton and the original surface. In this operation, each skeleton node is moved to the approximate center of its corresponding local mesh region. Each boundary of a mesh region includes a loop of vertices that are contracted to roughly the same location, which may often be off center, hence their weighted average displacement represents the shifting of the skeletal node from the center. Further detail on obtaining skeletons can be found in Oscar Kin-Chung Au, Chiew-Lan Tai, Hung-Kuo Chu, Daniel Cohen-Or, and Tong-Yee Lee, "*Skeleton Extraction by Mesh Contraction*", ACM Transactions on Graphics (SIGGRAPH 2008 issue), Vol. 27, No. 3, August 2008, pp. 44:1-44:10, which is incorporated by reference herein in its entirety.

In block 107, the first and the second skeletons are sampled to obtain corresponding first and second sets of sample points. A skeleton may include multiple lines, and each line may have corresponding end points. Referring to FIG. 2, which shows an example graph illustrating how to sample a line, it is assumed that $V_1(x_1,y_1,z_1)$ and $V_2(x_2,y_2,z_2)$ are two end points of a line of a skeleton. Assume that m points are sampled from the line $V_1V_2$, which points are noted as $C_1, C_2 \ldots C_i \ldots C_m$. When the line $V_1V_2$ is sampled in an evenly spaced way, sample point $C_i$ may be represented as the following equation (1).

$$C_i = \left(x_1 + \frac{i}{m+1}(x_2 - x_1), y_1 + \frac{i}{m+1}(y_2 - y_1), z_1 + \frac{i}{m+1}(z_2 - z_1)\right) \quad \text{equation (1)}$$

Those of ordinary skill in the art will appreciate that the skeletons can be sampled in ways other than evenly spaced. In one example, each line of a skeleton may be sampled using approximately the same spacing. For example, if a line with a length of $L_0$ has $m_0$ sample points, then the number of sample points of another line with a length $L_1$ may be $m_0 * L_1/L_0$. The number of sample points may be obtained after rounding in this case. A number of sample points may be given as an initial parameter, and the parameter may be adjusted by considering time cost, accuracy of searching/retrieving or the like.

Referring again to FIG. 1, in block 109, a first and a second matrices of distance related global constraint of the first and the second skeletons, respectively, are generated. In this operation, assume that a sequence including all sample points and end points of a skeleton is $P_0, P_1 \ldots P_{n-1}$, and one of the points is selected as reference point $P_k$. A distance related constraint between $P_i$ and $P_j$ may be defined as the following equation (2).

$$L_{ij}(P_k) = \min\{|P_kP_i|/|P_kP_j|, |P_kP_j|/|P_kP_i|\} \quad \text{equation (2)}$$

where $|P_kP_i|$ represents the distance between $P_k$ and $P_i$, and $|P_kP_j|$ represents the distance between $P_k$ and $P_j$.

Those of ordinary skill in the art will appreciate that the distance related constraint between $P_i$ and $P_j$ may be defined in other ways. Then distribution of the distance related global constraint of the sequence is generated. There are many distribution construction/analysis methods and, as will be appreciated by those of ordinary skill in art, although one example of which is described below, other applicable methods may be adopted as well.

In one embodiment, given $L_{ij} \in [0,1]$, the range is divided into s sub-regions (the number s may be set with consideration of implementation requirement or user preference etc.), i.e., $[x_0,x_1] \cup [x_1,x_2] \cup \ldots \cup [x_{s-1},x_s]$, where $x_0=0$, $x_s=1$. The ratio of elements in the $q^{th}$ sub-region over the number of all elements may be calculated using the following equation (3).

$$R_{Lq}(P_k) = \frac{2}{(s-1)(s-2)} \sum_{i=1}^{s-2} \sum_{j=i+1}^{s-1} h(L_{ij}(P_k)) \quad \text{equation (3)}$$

where $h(L_{ij}(P_k))=1$, if $L_{ij}$ is in the $q^{th}$ sub-region i.e., $\lfloor k_{q-1}, x_q \rfloor$, otherwise $h(L_{ij}(P_k))=0$, $P_k$ is the reference point.

The distribution of the distance related constraint can be represented by a vector $[R_{L1}(P_k), R_{L2}(P_k) \ldots R_{Ls}(P_k)]$. Then n $L_{ij}$ based distributions can be obtained by respectively taking $P_0, P_1 \ldots P_{n-1}$ as reference points, that may be $\{[R_{L1}(P_k), R_{L2}(P_k), \ldots, R_{Ls}(P_k)]|k=0, 1, \ldots n-1\}$, and a matrix of distance related global constraint may be generated as the following matrix (1). In one embodiment, each of the sample points and end points is taken as a reference point to generate a corresponding row of the matrix (1). Alternatively, a portion of the points may be used as reference points to generate corresponding rows of the matrix (1).

$$\begin{bmatrix} R_{L1}(P_0) & R_{L2}(P_0) & \ldots & R_{Ls-1}(P_0) & R_{Ls}(P_0) \\ R_{L1}(P_1) & R_{L2}(P_1) & \ldots & R_{Ls-1}(P_1) & R_{Ls}(P_1) \\ \vdots & \vdots & & \vdots & \vdots \\ R_{L1}(P_{n-2}) & R_{L2}(P_{n-2}) & \ldots & R_{Ls-1}(P_{n-2}) & R_{Ls}(P_{n-2}) \\ R_{L1}(P_{n-1}) & R_{L2}(P_{n-1}) & \ldots & R_{Ls-1}(P_{n-1}) & R_{Ls}(P_{n-1}) \end{bmatrix} \quad \text{matrix (1)}$$

Referring again to FIG. 1, in block 111, a first and a second matrices of angle related global constraint of the first and the second skeletons, respectively, are generated. In this operation, assume that a sequence including all sample points and end points of a skeleton is $P_0, P_1 \ldots P_{n-1}$, and a point $P_k$ is selected as the reference point. An angle related constraint between $P_i$ and $P_j$ may be defined as the following equation (4).

$$A_{ij}(P_k) = \angle P_i P_k P_j \quad \text{equation (4)}$$

where $\angle P_i P_k P_j$ represents the angle between $P_k P_i$ and $P_k P_j$.

In one embodiment, given $A_{ij} \in [0,180]$, the range is divided into s sub-regions, i.e., $[y_0,y_1] \cup [y_1,y_2] \cup \ldots \cup [y_{s-1},y_s]$, where $y_0=0$, $y_s=180$. The ratio of elements in the $q^{th}$ sub-region over the number of all elements may be calculated using the following equation (3).

$$R_{Aq}(P_k) = \frac{2}{(s-1)(s-2)} \sum_{i=1}^{s-2} \sum_{j=i+1}^{s-1} h(A_{ij}(P_k)) \quad \text{equation (3)}$$

where $h(A_{ij}(P_k))=1$, if $A_{ij}$ is in the $q^{th}$ sub-region i.e., $\lfloor y_{q-1}, y_q \rfloor$, otherwise $h(A_{ij}(P_k))=0$, $P_k$ is the reference point.

The distribution of the angle related constraint can be represented by a vector $[R_{A1}(P_k), R_{A2}(P_k) \ldots R_{As}(P_k)]$. Then n $A_{ij}$ based distributions can be obtained by respectively taking $P_0, P_1 \ldots P_{n-1}$ as reference points, that may be $\{[R_{A1}(P_k), R_{A2}(P_k), \ldots, R_{As}(P_k)]|k=0, 1, \ldots n-1\}$, and a matrix of angle related global constraint may be generated as the following matrix (2). The similarity between the first and the second 3D models may be calculated using the first and the second matrices of distance related global constraint, and the first and the second matrices of angle related global constraint. In some embodiments, an inter-position related global constraint can be taken into consideration in the similarity calculation to improve the accuracy of the calculation.

$$\begin{bmatrix} R_{A1}(P_0) & R_{A2}(P_0) & \ldots & R_{As-1}(P_0) & R_{As}(P_0) \\ R_{A1}(P_1) & R_{A2}(P_1) & \ldots & R_{As-1}(P_1) & R_{As}(P_1) \\ \vdots & \vdots & & \vdots & \vdots \\ R_{A1}(P_{n-2}) & R_{A2}(P_{n-2}) & \ldots & R_{As-1}(P_{n-2}) & R_{As}(P_{n-2}) \\ R_{A1}(P_{n-1}) & R_{A2}(P_{n-1}) & \ldots & R_{As-1}(P_{n-1}) & R_{As}(P_{n-1}) \end{bmatrix} \quad \text{matrix (2)}$$

Referring again to FIG. 1, in block 113, a first and a second matrices of inter-position related global constraint of the first and the second skeletons, respectively, are generated. In this operation, assume that a sequence including all sample points and end points of a skeleton is $P_0, P_1 \ldots P_{n-1}$, and a point $P_k$ is selected as the reference point. An inter-position related constraint between $P_i$ and $P_j$ may be defined as the following equation (5).

$$N_{ij}(P_k) = \frac{N(P_i) + N(P_j)}{N(P_k) + N(P_i) + N(P_j)} \quad \text{equation (5)}$$

where $N(P_i)$ may be defined as the following equation (6).

$$N(P_i) = S_v(P_i)/(S_m(P_i)+1) + S_v(P_i)\%(S_m(P_i)+1) \quad \text{equation (6)}$$

where $S_v(P_i)$ is the number of lines for which $P_i$ is one of the end points, $S_m(P_i)$ is the number of sample points being weighted towards $P_i$, and % is modulation operator.

An example of weighting is described below, however as those of ordinary skill in the art will realize that other methods for weighting can also be used. Referring to FIG. 3, which shows an example graph illustrating how to weight an end point when the end point is a common end point of more than three lines, the end points of the lines are weighted by related sample points if N, the number of lines for which $V_i$ is an end point, is greater than 3. As illustrated in FIG. 3, assuming there is an end point $V_i$ as a common end point for N lines, i.e., $V_iV_{T1}, V_iV_{T2}, V_iV_{T3} \ldots V_iV_{TN}$, along each line there are sample points as discussed above with respect to the sampling operation (FIG. 1, block 107). The middle points (in terms of length) of each of the N lines are connected to form a polygon $A_{T1}A_{T2}A_{T3}\ldots A_{TN}$ as shown in FIG. 3. Then the end point $V_i$ is weighted by the number of sample points within the polygon/triangle including those sample points on the edges and/or vertices of the polygon/triangle. For example, in FIG. 3, the middle point of line $V_iV_{T2}$ is $A_{T2}$, the sample points, i.e., sample point set, of the whole line $V_iV_{T2}$ are $C_1, C_2 \ldots C_{n-1}$, and $C_n$. Furthermore, one part of the line $V_iV_{T2}$, i.e., $V_iA_{T2}$, is within the polygon $A_{T1}A_{T2}A_{T3} \ldots A_{TN}$, then the sample points ($C_1, C_2 \ldots C_i$, for example) on that part of the line are thus within the polygon. Therefore, those sample points within the polygon are weighted towards the end point $V_i$. In one embodiment, if a sample point is on the boundary of the polygon, e.g., $C_i$ may overlap with $A_{T2}$, it is weighted towards the end point $V_i$ as well. The above process similarly applies to other lines, i.e., $V_iV_{T1}, V_iV_{T2} \ldots V_iV_{TN}$, as well.

In case that N equals 3, after connecting the middle points, a triangle is formed. In case that N equals 2, after connecting the middle points of two lines, a triangle is formed as well. Those two cases are illustrated in FIG. 4, which shows an example graph illustrating how to weight an end point when the end point is a common end point of three lines, and FIG. 5, which shows an example graph illustrating how to weight an end point when the end point is a common end point of two lines. In one embodiment, in case that N equals 3, the sample points on $BA_{T2}$ are weighted towards $V_i$, where B is the intersection point of $A_{T1}A_{T3}$ and $V_iV_{T2}$. In one embodiment, in case that N equals 2, the sample points on $V_iA_T1$ and $V_iA_{T2}$ are weighted towards $V_i$.

In one embodiment, given $N_{ij}\epsilon[0,1]$, the range is divided into s sub-regions, i.e., $[z_0,z_1]\cup[z_1,z_2]\cup\ldots\cup[z_{s-1},z_s]$, where $z_0=0, z_s=1$. The ratio of elements in the $q^{th}$ sub-region over the number of all elements may be calculated using the following equation (7).

$$R_{Nq}(P_k) = \frac{2}{(s-1)(s-2)}\sum_{i=1}^{s-2}\sum_{j=i+1}^{s-1} h(N_{ij}(P_k)) \quad \text{equation (7)}$$

where $h(N_{ij}(P_k))=1$, if $N_{ij}$ is in the $q^{th}$ sub-region, otherwise $h(N_{ij}(P_k))=0$, $P_k$ is reference point.

The distribution of the angle related constraint can be represented by a vector $[R_{N1}(P_k), R_{N2}(P_k) \ldots R_{Ns}(P_k)]$. Then n $N_{ij}$ based distributions can be obtained by respectively taking $P_0, P_1 \ldots P_{n-1}$ as reference points, that may be $\{[R_{N1}(P_k), R_{N2}(P_k), \ldots, R_{Ns}(P_k)|k=0, 1, \ldots n-1]\}$, and a matrix of angle related global constraint may be generated as the following matrix (3).

$$\begin{bmatrix} R_{N1}(P_0) & R_{N2}(P_0) & \ldots & R_{Ns-1}(P_0) & R_{Ns}(P_0) \\ R_{N1}(P_1) & R_{N2}(P_1) & \ldots & R_{Ns-1}(P_1) & R_{Ns}(P_1) \\ \vdots & \vdots & & \vdots & \vdots \\ R_{N1}(P_{n-2}) & R_{N2}(P_{n-2}) & \ldots & R_{Ns-1}(P_{n-2}) & R_{Ns}(P_{n-2}) \\ R_{N1}(P_{n-1}) & R_{N2}(P_{n-1}) & \ldots & R_{Ns-1}(P_{n-1}) & R_{Ns}(P_{n-1}) \end{bmatrix} \quad \text{matrix (3)}$$

Subsequent to the generation of a first and a second set of distance, angle, and inter-position related global constraints matrices of the first and the second skeletons (blocks 109, 111, and 113, respectively), in block 115, the similarity between the first and the second 3D models is calculated using the matrices. In one embodiment, the similarity between the first and the second 3D models is calculated using the following equation (8).

$$d=\text{sum}[\text{abs}(L_1-L_2)]+\text{sum}[\text{abs}(A_1-A_2)]+\text{sum}[\text{abs}(N_1-N_2)] \quad \text{equation (8)}$$

where $L_1$ represents a distance related global constraint matrix of the first skeleton, $L_2$ represents a distance related global constraint matrix of the second skeleton, $A_1$ represents an angle related global constraint matrix of the first skeleton, $A_2$ represents an angle related global constraint matrix of the second skeleton, $N_1$ represents an inter-position related global constraint matrix of the first skeleton, $N_2$ represents an inter-position related global constraint matrix of the second skeleton, and abs is absolute value operator.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, some of the functions may be conducted in parallel. In some embodiments, the numbers of sub-regions of $L_{ij}$, $A_{ij}$, and $N_{ij}$ may be different from each other, and users may set the numbers according to their precision requirements and time requirements. Those of ordinary skill in the art will also appreciate that $L_{ij}, A_{ij}$, and $N_{ij}$ may be defined in other ways. In method 100, 3D models may be compared based on their skeletons.

In addition, similarity between the first and the second 3D models may be calculated using distance and angle related matrices without using inter-position related matrices. In some embodiments, similarity between the first and the second 3D models can also be calculated based on sample points without end points.

Figure 6:
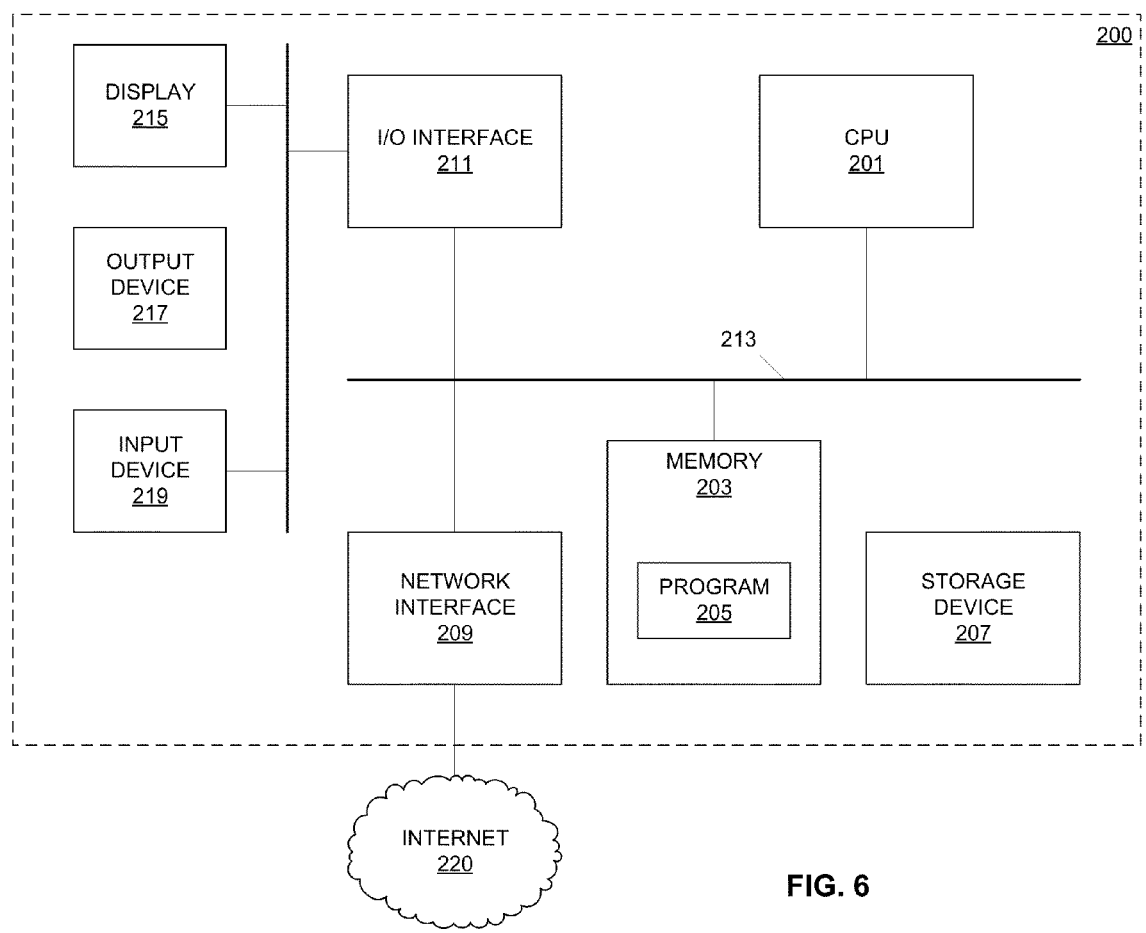
FIG. 6 shows a block diagram of an illustrative embodiment of a computer system for comparing 3D models.

Referring to FIG. 6, a block diagram of an illustrative embodiment of a computer system 200 for comparing 3D models is shown. The computer system 200 includes a CPU (central processing unit) 201, a memory 203 having a computer program 205 stored therein, a storage device 207, a network interface 209, and an I/O interface 211 connected together by a BUS 213. The computer system 200 further includes a display 215, an output device 217, and an input device 219 connected to the I/O interface 211.

When executed by the CPU 201, the computer program 205 may instruct the CPU 201 to conduct the 3D model comparing methods described above. The computer program 205 may be loaded from the storage device 207 or from internet 220 to which the computer system 200 is connected through the network interface 209. The display 215 may display information and data to facilitate the execution of the method 100 described above by, for example, users of the computer system 200. The output device 217 may output results of the comparison. The input device 219 may facilitate the reception (e.g., input) of instructions from, for example, users. User instructions may be instructions of starting or aborting the method 100, or various parameters to facilitate the execution of the method 100.

Those of ordinary skill in the art will appreciate that the computer system 200 may be any kind of personal computer, server, workstation, PDA, mobile phone, etc. suitable for executing 3D model comparing methods of the present disclosure.

Figure 7:
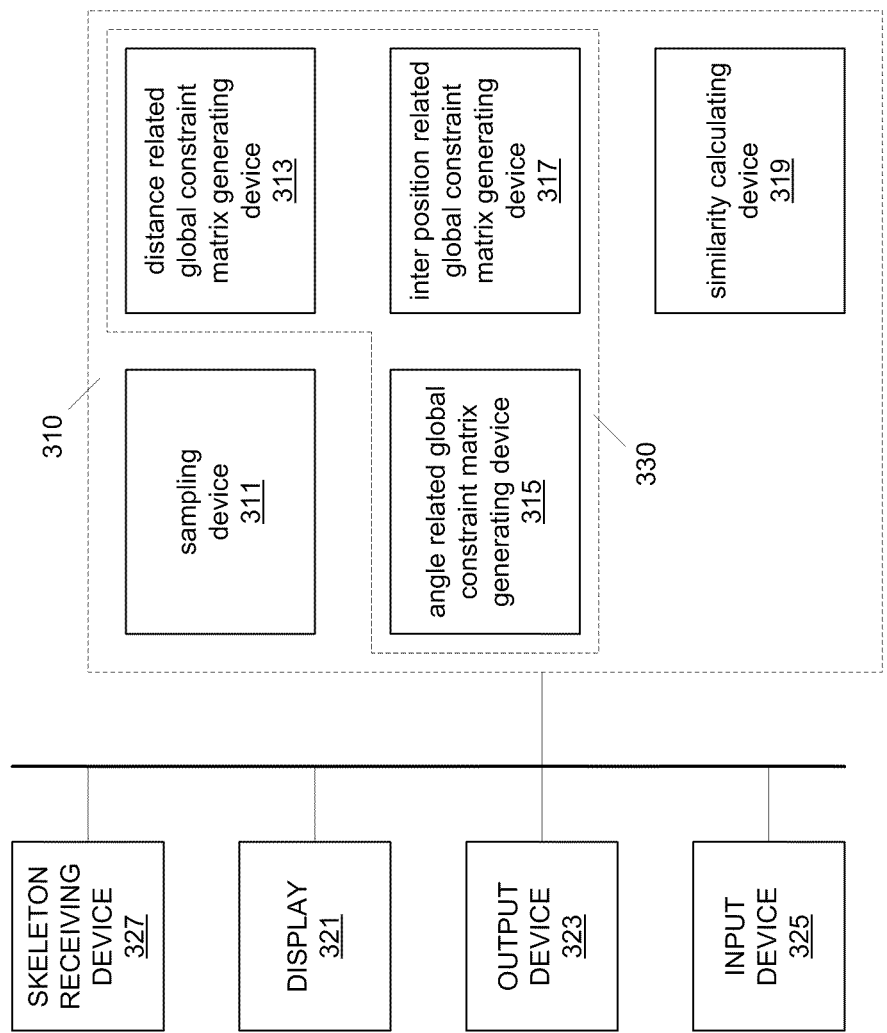
FIG. 7 shows a block diagram of an illustrative embodiment of a 3D model comparing device.

Referring to FIG. 7, a block diagram of an illustrative embodiment of a 3D model comparing device 310 is shown. The device 310 includes a sampling device 311, a distance related global constraint matrix generating device 313, an angle related global constraint matrix generating device 315, an inter-position related global constraint matrix generating device 317, and a similarity calculating device 319.

The sampling device 311 may sample a skeleton to obtain a corresponding set of sample points. The distance related global constraint matrix generating device 313 may generate a distance related global constraint matrix using a corresponding set of sample points obtained by the sampling device 311, or using a corresponding set of sample points and end points, according to for example the operation of block 109 described above. The angle related global constraint matrix generating device 315 may generate an angle related global constraint matrix using a corresponding set of sample points obtained by the sampling device 311, or using a corresponding set of sample points and end points, according to for example the operation of block 111 described above. The inter-position related global constraint matrix generating device 317 may generate an inter-position related global constraint matrix using a corresponding set of sample points obtained by the sampling device 311, or using a corresponding set of sample points and end points, according to for example the operation of block 113 described above. The similarity calculating device 319 may calculate similarity between 3D models using corresponding distance, angle, and interposition related matrices according to for example the operation of block 115 described above.

In addition, a display 321, an output device 323, an input device 325, and a skeleton receiving device 327 may be coupled to the 3D model comparing device 310. The display 321 may show information and data to facilitate the execution of the method 100 described above by, for example, users of the 3D model comparing device 310. The output device 323 may output the results of the calculation by the similarity calculating device 319. The input device 325 may facilitate the reception (e.g., input) of instructions from, for example, users. User instructions may be instructions of starting or aborting the method 100, or various parameters to facilitate the execution of the method 100. The skeleton receiving device 327 may receive skeletons of 3D models to be compared, and send the received skeletons to the sampling device 311 for sampling. Since the calculation of distance, angle, and inter-position related global constraints matrices may be similar, the distance related global constraint matrix generating device 313, the angle related global constraint matrix generating device 315, and the inter-position related global constraint matrix generating device 317 may be integrated as a global constraints matrices obtaining device 330, or may share at least part of hardware or circuits.

In some embodiments, the 3D model comparing device 310 may be implemented as an Application Specific Integrated Circuit (ASIC), or a Field Programmable Gate Array (FPGA), etc.

Figure 8:
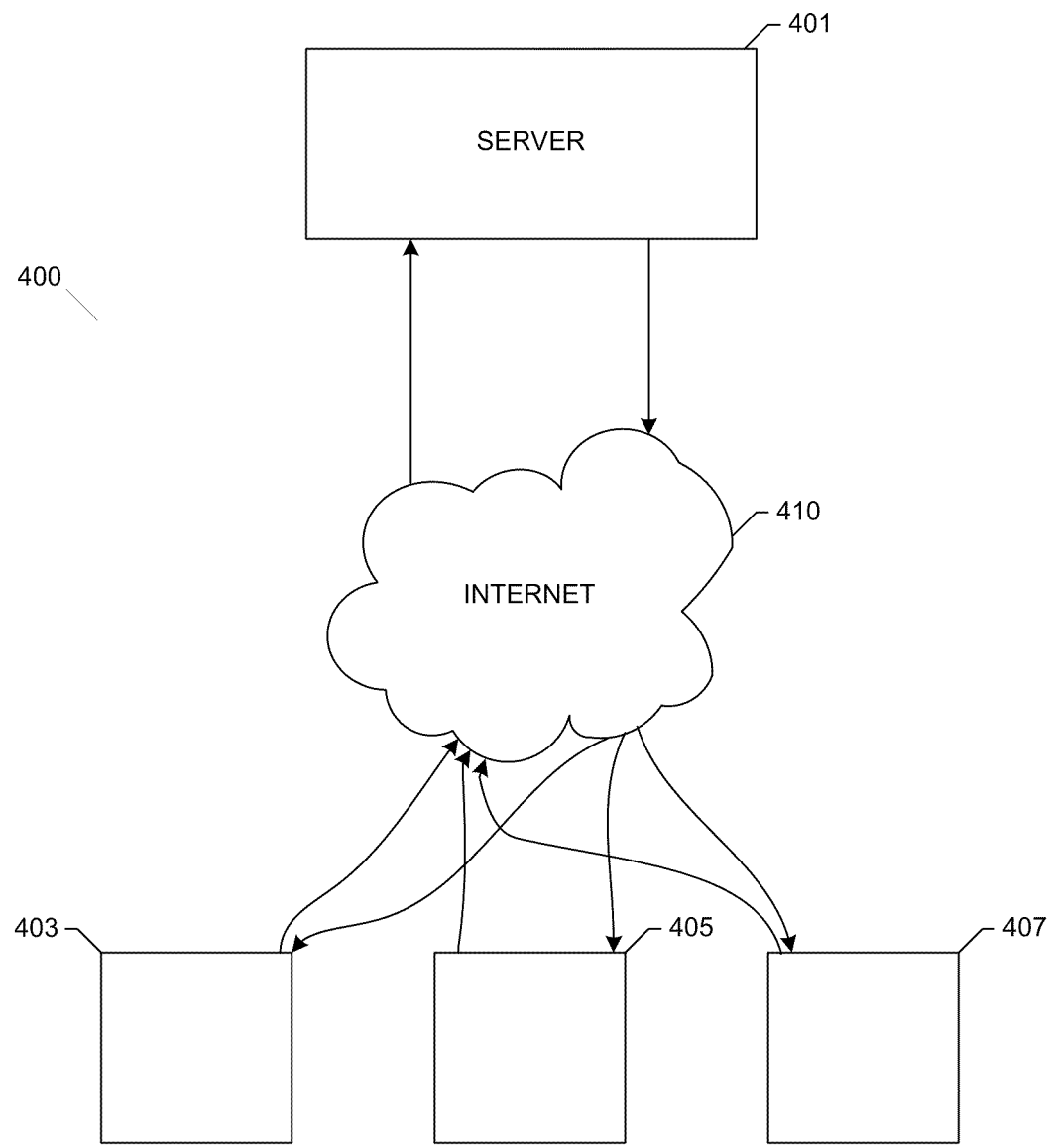
FIG. 8 shows a block diagram of an illustrative embodiment of a system for comparing 3D models.

Referring to FIG. 8, a block diagram of an illustrative embodiment of a system 400 for comparing 3D models is shown. The system 400 includes a server 401, client computers 403, 405, and 407, and the internet 410. The server 401 may store 3D models therein, and may calculate similarity between 3D models according to a user's request and send the calculated results back to the user. A user may request the server 401 to calculate similarity between 3D models using any one of the client computers 403, 405, and 407 through the internet 410.

Those of ordinary skill in the art will appreciate that any number and any kind of servers could be included in the system 400. For example, there may be a server for sampling skeletons, a server for calculating distance related global constraint matrices, a server for calculating angle related global constraint matrices, a server for calculating inter-position related global constraint matrices, and a server for storing data etc.

Because the present disclosure uses skeletons to calculate similarity between 3D models, one benefit is that calculation complexity is significantly reduced, therefore, allowing for a faster comparison of 3D models.

Industrial designers may use the techniques of the present disclosure to compare their industrial designs with conventional designs. The techniques of the present disclosure can also be used in facial recognition applications to access a physical location or a computer, etc. by comparing a 3D imaged face with stored faces of authorized persons. In another embodiment, the techniques of the present disclosure can be used to identify persons of interest e.g., criminals, in airports, train stations or other public spaces by comparing a 3D imaged face with stored faces of persons of interest. The disclosed techniques can also be used to provide location related data on objects/locations snapped by a camera phone etc. by comparing a 3D imaged object with stored 3D objects and providing related data of a corresponding stored 3D object that matches with the snapped 3D object.

The present disclosure is not to be limited in terms of the particular embodiments described in this disclosure, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
    determining, by a system comprising a processor, first data representing a first skeleton of a first three dimensional (3D) model;
    determining second data representing a second skeleton of a second 3D model;
    in response to determining that a number of lines of the first skeleton, for which a sample point of the first skeleton is an end point, satisfies a defined criterion, determining interposition-related global constraint data comprising an interposition-related global constraint for the sample point in accordance with weighting the sample point based on another number of other sample points that are within a polygon that connects mid-points of the lines; and
    determining a similarity between the first 3D model and the second 3D model based on a set of matrices corresponding to the first skeleton that comprises a matrix of the interposition-related global constraint data.

2. The method of claim 1, wherein the determining the similarity between the first 3D model and the second 3D model further comprises:
    based on the first data, determining a first set of matrices comprising a first matrix of distance-related global constraints and a first matrix of angle-related global constraints associated with the first skeleton;
    based on the second data, determining a second set of matrices comprising a second matrix of distance-related global constraints and a second matrix of angle-related global constraints associated with the second skeleton; and
    determining the similarity between the first 3D model and the second 3D model based on the first set of matrices and the second set of matrices.

3. The method of claim 2, wherein the determining the similarity between the first 3D model and the second 3D model further comprises summing up absolute values of differences between data represented within respective matrices of the first set of matrices and the second set of matrices.

4. The method of claim 2, wherein the sample point is a reference point and the determining the first set of matrices comprises determining a distance-related global constraint between a first sample point and a second sample point of the first skeleton based on a first distance between the reference point and the first sample point and a second distance between the reference point and the second sample point.

5. The method of claim 2, wherein the sample point is a reference point and the determining the second set of matrices comprises determining an angle-related global constraint between a first sample point and a second sample point of the first skeleton based on an angle between a first line that passes through the first sample point and the reference point and a second line that passes through the second sample point and the reference point.

6. The method of claim 2, wherein the sample point is a reference point and the determining the first matrix of distance related global constraints comprises:
    determining distance-related global constraint data indicative of a distance-related global constraint between a first sample point and a second sample point of the first skeleton relative to the reference point;
    incorporating the distance-related global constraint data into a vector comprising a distribution of distance-related global constraints respectively corresponding to respective pairs of sample points sampled from the first skeleton and relative to the reference point; and
    integrating the vector as a row of the first matrix of distance-related global constraints.

7. The method of claim 6, wherein the determining the distance-related global constraint data further comprises determining ratio data indicative of a ratio of a first distance between the first sample point and the reference point, and a second distance between the second sample point and the reference point.

8. The method of claim 2, wherein the sample point is a reference point and the determining the first matrix of angle related global constraints comprises:
    determining angle-related global constraint data indicative of an angle-related global constraint between a first sample point and a second sample point of the first skeleton relative to the reference point;
    incorporating the angle-related global constraint data into a vector comprising a distribution of angle-related global constraints respectively corresponding to respective pairs of sample points sampled from the first skeleton and relative to the reference point; and
    integrating the vector as a row of the first matrix of angle-related global constraints.

9. The method of claim 1, wherein the matrix comprises a matrix of weight-related global constraints.

10. The method of claim 1, wherein the set of matrices is a first set of matrices, the matrix is a first matrix, the interposition-related global constraint is a first interposition-related global constraint, the sample point is a first sample point, and the determining the similarity comprises determining the similarity between the first 3D model and the second 3D model based on a second set of matrices corresponding to the second skeleton that comprises a second matrix of interposition-related global constraint data that comprises a second interposition-related global constraint for a second sample point of the second skeleton.

11. The method of claim 1, further comprising
    sampling the first data to determine a set of sample points comprising the sample point.

12. The method of claim 11, further comprising:
determining a subset of the set of sample points that are endpoints.

13. The method of claim 11, wherein the sampling comprises sampling the first data to determine an evenly spaced set of sample points.

14. The method of claim 1, wherein the determining the first data comprises determining the first data based on a Laplacian smoothing operation.

15. The method of claim 1, wherein the determining the first data comprises determining the first data based on a connectivity surgery operation.

16. The method of claim 1, wherein the other number of other sample points is a first number of first sample points and the determining the interposition-related global constraint data comprises determining the interposition-related global constraint data based on a second number of second sample points on the lines, wherein the second number of second sample points are determined to be weighted towards the sample point.

17. The method of claim 1, wherein the determining the similarity comprises determining the similarity between the first 3D model and the second 3D model based on at least two of distance-related global constraints, angle-related global constraints, or interposition-related global constraints respectively associated with the first skeleton and the second skeleton.

18. The method of claim 1, wherein sample point is a reference point and the method further comprises:
determining the matrix of interposition-related global constraints, comprising:
determining the interposition-related global constraint data that is indicative of the interposition-related global constraint between a first sample point and a second sample point of the first skeleton relative to the reference point;
incorporating the interposition-related global constraint data into a vector comprising a distribution of interposition-related global constraints respectively corresponding to respective pairs of sample points sampled from the first skeleton and relative to the reference point; and
integrating the vector as a row of the matrix of interposition-related global constraints.

19. The method of claim 18, further comprising:
determining, respectively for the first point, the second point, and the reference point, a first interposition value, a second interposition value, and a reference interposition value, wherein the determining the interposition-related global constraint data comprises determining the interposition-related global constraint data based on the first interposition value, the second interposition value, and the reference interposition value.

20. The method of claim 1, wherein the determining that the number of lines of the first skeleton satisfies the defined criterion comprises determining that the number of lines is greater than two.

21. The method of claim 1, wherein the other number of other sample points is a first number of first sample points and the methods further comprises:
in response to determining that the number of lines is two, determining a triangle that has the sample point and mid-points of the lines as vertices; and
weighting the sample point based on a second number of second sample points that are on the perimeter of the triangle.

22. A system, comprising:
a processor, coupled to a memory that stores instructions, that executes or facilitates execution of the instructions to at least:
determine respective matrices of interposition-related global constraint data corresponding to skeletons of three dimensional (3D) models that are to be compared, wherein the interposition-related global constraint data represents an interposition-related global constraint for a sample point on a first skeleton of the skeletons that is determined in response to determining that a number of lines of the first skeleton for which the sample point is an end point satisfies a defined criterion and wherein the interposition-related global constraint data is determined in accordance with weighting the sample point based on another number of other sample points that are within a polygon that connects mid-points of the lines; and
determine similarity data indicative of a similarity between the 3D models based on the respective matrices.

23. The system of claim 22, wherein the processor further executes or facilitates execution of the instructions to:
sample respective skeletons of the 3D models to determine corresponding sets of sample points, respective skeletons;
wherein the respective matrices of interposition-related global constraints are determined based on the corresponding sets of sample points.

24. The system of claim 22, wherein the similarity data is determined using a sum of absolute values of differences between values represented within the respective matrices of interposition-related global constraints.

25. A non-transitory computer-readable storage medium comprising computer-executable instructions that, in response to execution, cause a device comprising a processor to perform operations, comprising:
determining first data indicative of a first matrix of interposition-related global constraint data associated with a first skeleton of a first three dimensional (3D) model, wherein the interposition-related global constraint data comprises an interposition-related global constraint for a sample point of the first skeleton that is determined in response to a number of lines of the first skeleton for which the sample point is an end point being determined to satisfy a defined criterion and wherein the interposition-related global constraint data is determined in accordance with weighting the sample point based on another number of other sample points that are within a polygon that connects mid-points of the lines; and
determining a similarity between the first 3D model and a second 3D model based on the first data and second data indicative of a second matrix of interposition-related global constraint data associated with a second skeleton of the second 3D model.

* * * * *